Dec. 28, 1965  S. C. ORR, JR  3,225,740

EGG HATCHING SYSTEM

Filed Dec. 13, 1963  3 Sheets-Sheet 1

INVENTOR.
SYDNEY C. ORR, JR.
BY
*Marechal, Biebel, French & Bugg*
ATTORNEYS

Dec. 28, 1965 S. C. ORR, JR 3,225,740
EGG HATCHING SYSTEM
Filed Dec. 13, 1963 3 Sheets-Sheet 2
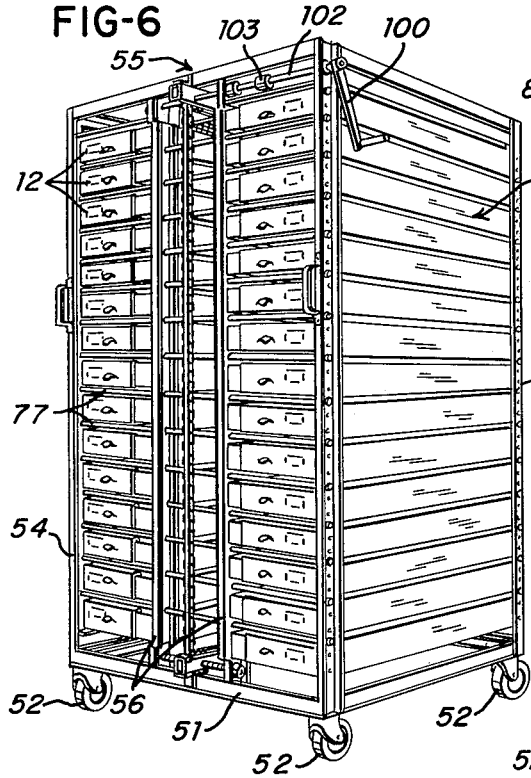
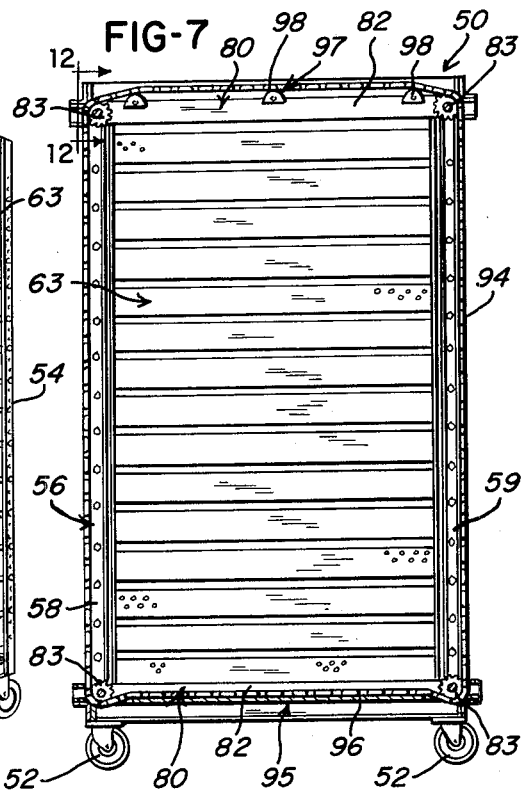
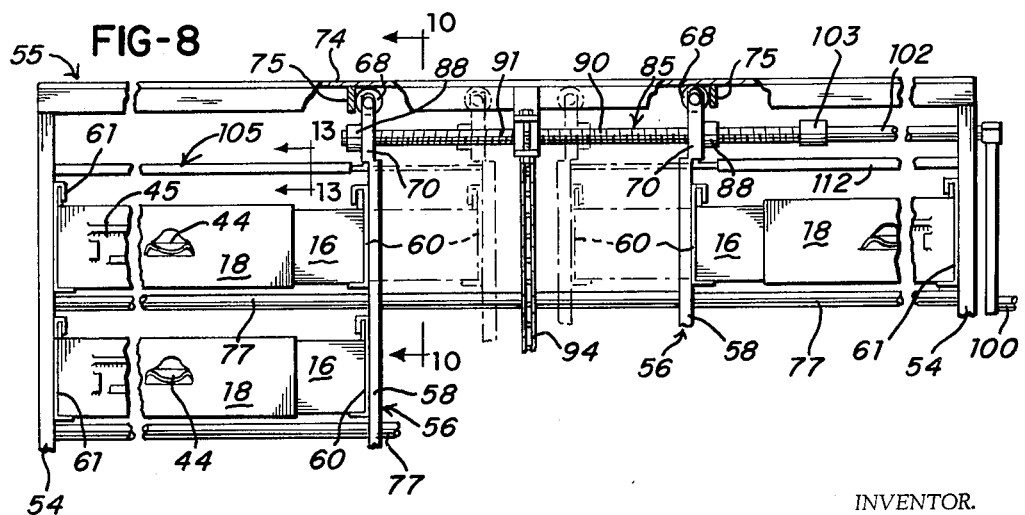
INVENTOR.
SYDNEY C. ORR, JR.
BY
ATTORNEYS

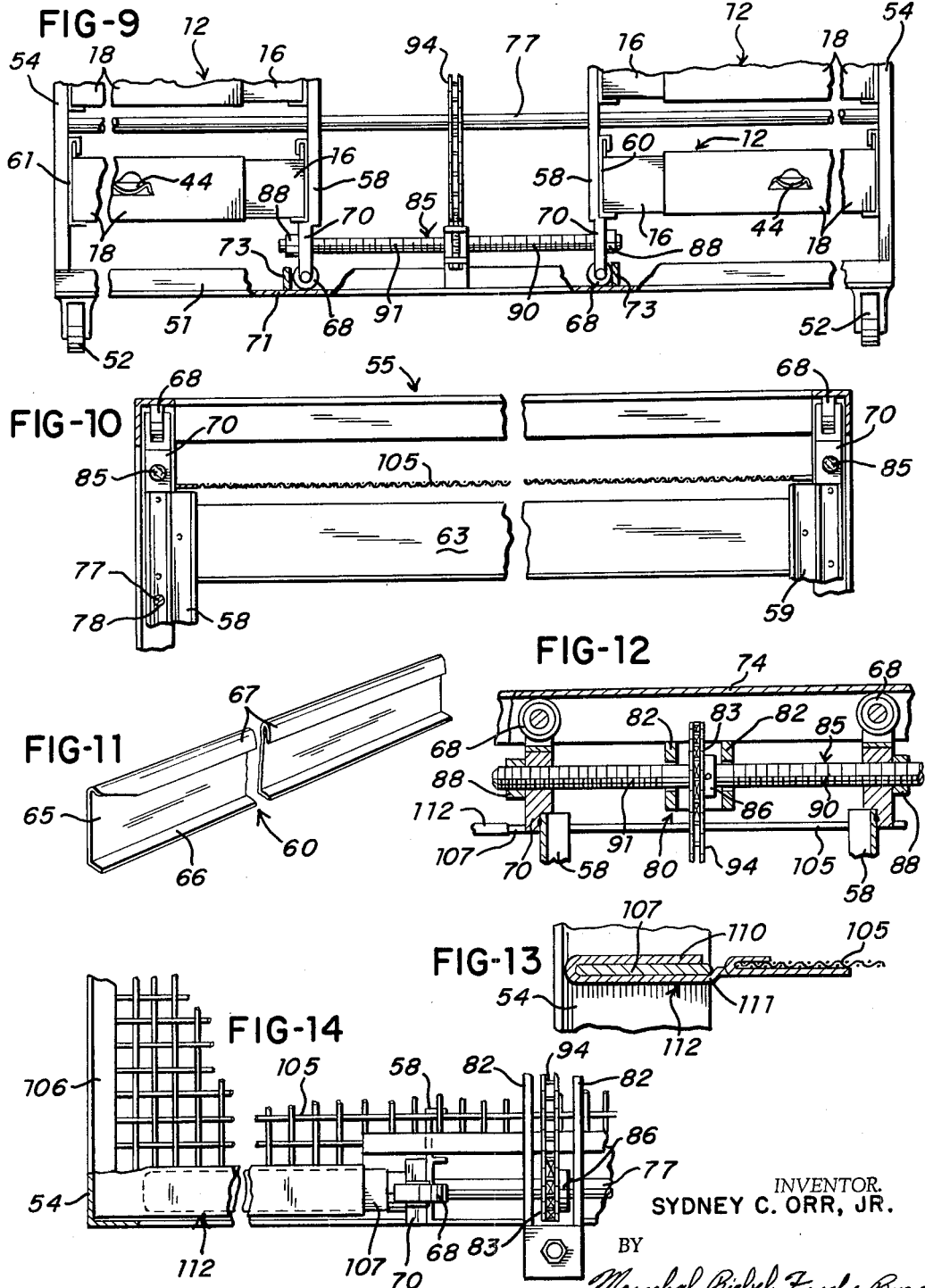

United States Patent Office 3,225,740
Patented Dec. 28, 1965

3,225,740
EGG HATCHING SYSTEM
Sydney C. Orr, Jr., Springfield, Ohio, assignor to Buckeye Manufacturing Company, Kansas City, Mo., a corporation of Delaware
Filed Dec. 13, 1963, Ser. No. 330,399
9 Claims. (Cl. 119—35)

This invention relates to the art of hatching eggs, and particularly to an apparatus for processing eggs for incubation and hatching thereof.

There are two commercially significant systems for incubating and hatching eggs artificially in very large quantities. One of these systems uses a single enclosure which is filled with eggs and the temperature and humidity varied as required for incubation and hatching of the eggs without removal from the enclosure. The other system uses separate incubating and hatching enclosures which have different constant temperature and humidity conditions therein.

Since the incubation time is much greater than the time required for hatching, the eggs are processed through the separate enclosure system in groups so that maximum use is made of both the incubator and hatcher enclosure. For chicks, the normal incubation period is eighteen days and the hatching period about three days, and by staggering the filling of the incubator so that one-sixth of the eggs are ready to be removed from the incubator and transferred to the hatcher every three and one-half days both enclosures are used substantially continually. The staggering of the periods of incubation is of course only permitted in this dual enclosure system since the temperature and humidity never change substantially in the incubator.

This invention relates to such a dual enclosure system, wherein the eggs are placed first in a tray in snug contact with each other so that when the full tray is tilted, as is conventional during the incubation cycle, there is no substantial relative movement between the eggs. Many incubators rotate the tray through as much as forty-five degrees in both directions from the horizontal, and thus the eggs must be held snugly together to prevent breakage thereof. After the incubation period the eggs are transferred manually to a larger tray having sufficient space therein for proper hatching and drying of the chicks, and this larger tray is placed in the hatcher.

The transfer of eggs from one tray to another is quite undesirable from the standpoint of cost and hatchability of the eggs since the transfer requires a substantial amount of time and labor to effect the transfer, and there is no other satisfactory method for making this transfer. In addition, the cost of the labor required to make the transfer and the cost of eggs broken in transfer adds substantially to the ultimate cost of the chicks. Moreover, the time required to make this transfer also allows the eggs to cool which will lengthen the hatching cycle, and this transfer time also detracts from the optimum use of the hatching equipment. It is also necessary to wash each of the incubator trays and each hatching tray after each is used to remove bacteria therefrom, and obviate potential contamination of the next batch of eggs processed therein.

A very serious problem which results from the use of the dual tray system is the loss of eggs due to breakage. When an eggs is spoiled it will often explode during the incubation cycle and the yolk and white of the egg flow around the adjacent good eggs. The heat causes the egg yolk and white to dry out creating a bond between the adjacent eggs and the tray so that these good eggs are most often broken during the removal from the incubator trays.

Accordingly, it is an important object of this invention to provide an apparatus for transferring eggs quickly and easily from the incubator to the hatcher without the transfer of eggs from one tray to a larger tray thereby to reduce the cost of labor, as well as egg breakage with a consequent decrease in the two most important factors which affect the ultimate cost of a hatching operation.

Another object of this invention is to provide an improved egg hatching system wherein there is minimum handling of the eggs to reduce the time required for transfer thereof from an incubator to a hatcher, and further to provide apparatus of the type which can be used with existing incubators and hatchers without modification thereof.

A further object of this invention is to provide an improved egg handling system which eliminates the manual transfer of eggs from one tray to a larger tray for hatching, and particularly to provide apparatus which is simple in design and operation and therefore inexpensive in cost and dependable in operation.

A further object of this invention is to provide an apparatus whereby eggs which have become fastened to the incubator tray because of an adjacent broken egg or eggs would not cause the loss of the adjacent good eggs, and further to provide a single tray system wherein eggs do not require transfer before hatching so that eggs which are glued in place will hatch in a normal manner and wherein there is but a single tray to wash after each complete hatching cycle.

A further object of this invention is to provide an apparatus for handling eggs during incubation and hatching which includes trays capable of being expanded from one size for incubation to a larger size for hatching, and further to provide apparatus for simultaneously expanding a large number of such trays without removing the eggs therefrom so that only a small amount of time is required to transfer a substantial number of eggs from the incubator to the hatcher.

Still further objects and advantages of the invention will be apparent from the following description, the accompanying drawings and the appended claims.

In the drawings—

FIG. 6 is a perspective view of the hatcher rack for the egg trays;

FIG. 7 is a sectional view through the center of the rack shown in FIG. 6;

FIG. 8 is a fragmentary elevation view of the upper portion of the front of the rack;

FIG. 9 is a fragmentary elevation view similar to FIG. 8 but showing the lower front portion of the rack;

FIG. 10 is a sectional view taken essentially along the line 10—10 of FIG. 8;

FIG. 11 is a perspective view of one of the tray supporting shelves;

FIG. 12 is an enlarged sectional view taken essentially along the line 12—12 of FIG. 7;

FIG. 13 is another sectional view taken along the line 13—13 of FIG. 8; and

FIG. 14 is a fragmentary plan view of a top corner of the rack.

Figure 1:
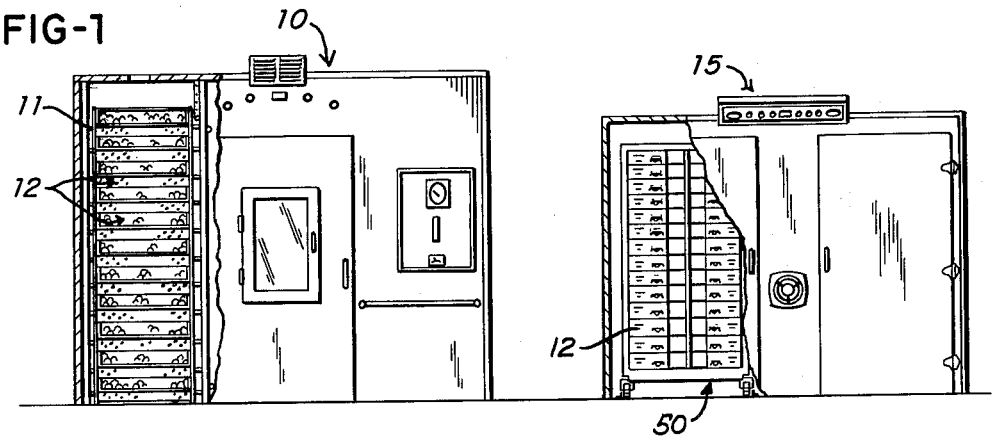
FIG. 1 is a front elevation view, partially broken away, of egg hatching apparatus including an incubator and a hatcher.

Referring to the drawings wherein a preferred embodiment of the invention is shown, FIG. 1 illustrates an incubator enclosure 10 having the permanent racks 11 which support a plurality of individual egg trays 12 for tilting through a prescribed angle to enhance the hatchability of the eggs. A typical incubator of this type is shown and described in the United States Patent to Taggart No. 2,281,339, issued April 28, 1942. After the eggs have been in the incubator for the prescribed period of time in an atmosphere having the prescribed temperature and humidity conditions, they are removed and placed in a hatcher 15 wherein the air temperature is lower and the humidity higher than in the incubator 10 to effect maximum hatching of the eggs.

Figure 2:
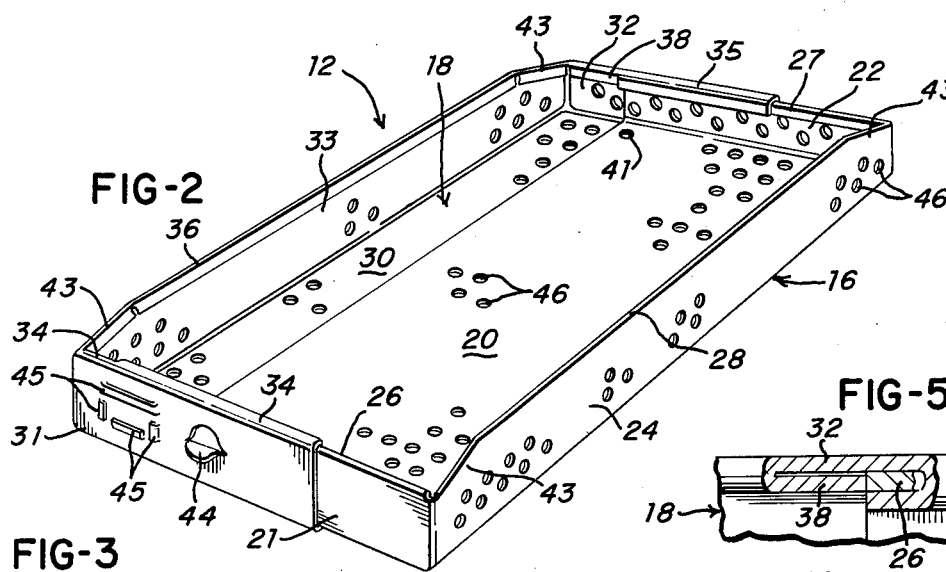
FIG. 2 is a perspective view of an expandable egg tray in accordance with the invention.

The invention contemplates the handling of eggs in expandable trays 12 which assume one size for holding the eggs snugly together during incubation, and which can be expanded to the size required during hatching without the removal of eggs therefrom. A tray 12 is shown in FIG. 2 and includes inner and outer sections 16 and 18 which telescope together, with the inner section 16 having a bottom wall 20 with the end walls 21 and 22 at each end thereof and a side wall 24 on only one side thereof. The top edges 26, 27 and 28 of the walls 21, 22 and 24, respectively, are bent over to add rigidity thereto so that the configuration of the section 16 will hold up insuring proper operation after long periods of rough handling.

The outer section 18 of the trays 12 has a bottom wall 30 with end walls 31 and 32 at each end thereof and a side wall 33 along one edge of the bottom wall 30. Each of these walls 31, 32 and 33 has its upper edges 34, 35 and 36, respectively, bent over for reinforcement and these walls are slightly larger in arear than the corresponding walls of the inner section 16 so that the sections 16 and 18 will slide together with the top edges 26, 27, 34 and 35 of the end walls 21, 22, 31 and 32 aligned in the same plane. The end walls 31 and 32 are formed with an inverted U-shaped guide near the top edges thereof so that the edges 26 and 27 of the end walls 21 and 22 of the inner section 16 are received snugly therein for guiding the sections 16 and 18 together. The guides 35 also act as retainers for holding the inner and outer sections 16 and 18 together against any substantial relative movement.

Figure 5:
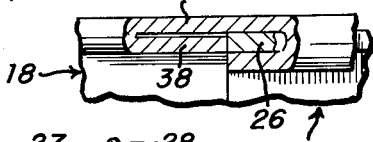
FIG. 5 is a fragmentary section view taken along the line 5—5 of FIG. 4.

As shown in FIGS. 2 and 5, the guides 34 and 35 are formed by bending the end walls 31 and 32 over in a manner so that the guides 34 and 35 are spaced from the adjacent end wall a distance slightly greater than the thickness of the upper edge 26 or 27 or of the adjacent end wall 21 or 22 for sliding movement therebetween. Movement of the tray sections 16 and 18 together is limited by the stop portions 38 of the guides 34 and 35 which are deformed inwardly and lie in contact with the adjacent end wall 21 or 22 so that they form abutments which prevent additional movement of the end walls together, as viewed in FIG. 5.

Figure 4:
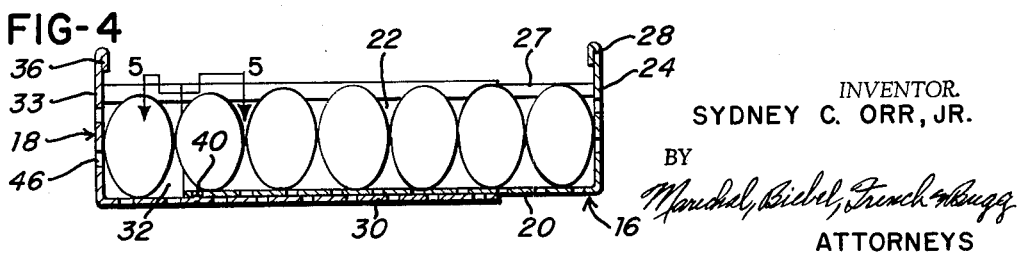
FIG. 4 is a sectional view similar to FIG. 3 but showing the egg tray in its incubator position.

The tray sections 16 and 18 are held in the retracted position, as seen in FIG. 4, by engagement of the dimple shaped projections 40 in the top surface of the bottom wall 30 with aligned apertures 41 in the bottom wall 20 of the inner section of the tray. This projection-aperture combination requires a certain amount of force to separate the tray sections from the retracted position, and thus the tray will remain in the retracted position during filling thereof.

Figure 3:
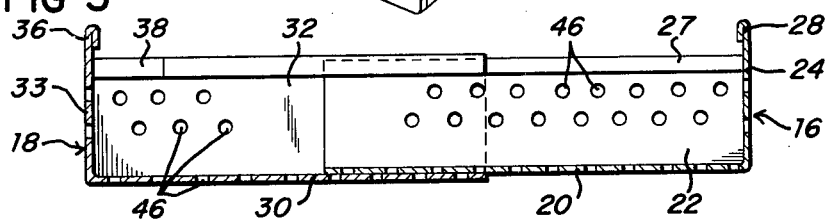
FIG. 3 is a sectional view of the egg tray in an expanded hatching position.

The top edges 28 and 36 of the side walls 24 and 33 project above the top edges 26 and 35 of the end walls 21 and 31, as shown in FIGS. 3 and 4, to use in automatic expansion of the trays 12, as will be described. These top edges have the tapered portions 43 at each end thereof for a gradual transition from the adjacent top edges of the end walls 21, 22, 31, and 32 to the higher edges 28 and 36 on the side walls 24 and 33. In addition, the front end wall 31 is provided with a handle 44 and the card holding members 45 both of which are cut from the end wall 31.

The inner and outer tray sections 16 and 18 are constructed from perforated sheet metal having a plurality of openings 46 throughout the surfaces thereof to insure proper air flow through the trays and around the eggs. It is, however, possible to construct the trays 12 of other materials and with different structural configurations than those shown and described, so long as the tray is capable of being expanded as described and so long as the eggs are properly exposed to the air flow.

An important feature of the invention is the transfer rack 50, shown in FIGS. 6–14, which is capable of accommodating a large number of the egg trays 12 for transfer, expansion, and retraction thereof. The rack 50 includes a rectangular base frame 51 having the four coaster wheels 52 thereon and the four upright corner posts 54 rigidly secured thereto. An upper frame 55 is secured on the top of the corner posts 54 so that a six-sided space is defined between these frame components.

A pair of movable vertical inner frames 56 are mounted within the rack 50, and each includes the parallel front and rear vertical members 58 and 59 (FIG. 7) having a plurality of tray support shelves 60 (FIG. 11) secured horizontally therebetween for movement therewith. As shown in FIG. 8, an identical set of horizontal retainer shelves 61 are secured to the outer side walls 63 of the rack between pairs of the corner posts 54, and the shelves 60 and 61 are aligned and cooperate to receive the trays 12, as will be explained. Each of the shelves 60 and 61 includes a vertical side wall 65 having a horizontal support surface 66 on the lower edge thereof and a bent over hook portion 67 along the upper edge thereof for engaging the top edges 28 and 36 of the tray side walls 24 and 33.

The movable inner frames 56 are supported and guided by the rollers 68 carried in the brackets 70 mounted on the top and bottom, respectively, of the members 58 and 59. The rollers 68 on the bottom of the members 58 and 59 (FIG. 9) thus engage and ride on the guide portion 71 of the lower frame 51, and the stops 73 are rigidly secured to the guide portion 71 to limit the distance that the rollers 68 and members 56 can be moved from the center of the rack 50. In a similar manner, the roller 68 on the top of the members 58 and 59 (FIG. 8) engage the guide portions 74 of the upper frame 55 and the stops 75 limit the extent to which the inner frames 56 may be separated.

A plurality of spacers 77 extend transversely across the front and rear of the rack 50, and are secured to and supported by the corner posts 45 (FIGS. 6–9) below each pair of the shelves 60 and 61. These spacers prevent the newly hatched baby fowl from escaping through the space between the adjacent trays which must have sufficient space therebetween for air flow over the eggs and for easy insertion of the trays 12.

The actuating mechanism for effective movement of the inner frames 56 includes an upper and lower horizontal sprocket carriers 80 which are secured between the front and rear members of the upper and lower frames 51 and 56. Both the upper and lower sprocket carriers 80 include a pair of parallel support bars 82

(FIG. 12) having a chain sprocket 83 secured on a drive shaft 85 by the hub 86. The shafts 85 are supported between the bars 82 and project in a horizontal plane outwardly of the carriers 80 to a connection with the brackets 70 on the top and bottom of the vertical members 58 and 59 of the inner frames 56. Specifically, each of the shafts 85 is threaded to be received in an internally threaded nut member 88 rigidly secured against movement on the brackets 70 so that rotation of the shafts 85 causes the inner frames 56 to move toward or away from the center of the rack. The right and left hand portions 90 and 91, as viewed in FIG. 12, of each of the shafts 85 are threaded in opposite directions so that when the shaft rotates the vertical members 58 and 59 are simultaneously moved apart or drawn together.

The shafts 85 are secured against axial movement in the carriers 80 by the identical chain sprockets 83 (see FIG. 7) and are interconnected by an endless drive chain 94. The lower run 95 of this chain 94 is supported by the guide plate 96 or its equivalent secured to the lower carrier 80, and the upper run 97 of the chain 94 is supported by the guides 98 of the upper carrier 80. Thus by rotating one of the sprockets 83, each of the other sprockets and all of the shafts 85, are rotated at the same speed through an identical number of revolutions.

The manual crank 100 on the upper right-hand corner (FIG. 6) of the rack 50 is connected to a shaft 85 by a transfer shaft 102 and the joint 103 so that rotation of the crank 100 effects rotation of the shaft 85 and the drive chain 94 to move the inner frames 56 toward or away from each other. Thus by rotating the crank 100 each of the four shafts 85 is rotated at the same speed to move the top and bottom of each of the vertical members 58 and 59 toward or away from the center of the rack 50 at precisely the same speed. While this movement is shown and described as being effected manually, it could be accomplished by use of a motor having automatic controls associated therewith without departing from the scope of the invention.

The top of the rack 50 has a screen 105 thereon (FIGS. 8, 13 and 14) which protects the eggs in top trays 12 in the rack from falling objects and prohibits the newly hatched fowl from escaping from the upper two trays 12. The screen covers the entire area between the corner posts 54, and the solid border members 106 on the sides thereof support the screen between the posts 54. As seen in FIG. 14, a clearance is provided in the screen to allow movement of the brackets 70. In order to cover the area above this clearance when the trays are expanded, the flat elongated plates 107 are secured to the brackets 70 for movement therewith. These plates 107 reciprocate between the upper and lower portions 110 and 111 of the border members 112 on the front and rear of the screen 105 so that, as the inner frames 54 move inwardly toward the center of the rack, the plates 107 are withdrawn from the member 112 and maintain a cover over the entire front and rear portions of the expanded trays.

The process of the invention is carried out by first filling a plurality of the expandable egg trays 12 while these trays are in their retracted position, as shown in FIG. 4. The tray filling operation is accomplished in any one of several conventional manners, for example by the use of a special table which positions the tray in a sloped position so that the eggs can be placed snugly therein in an upright position wherein they are held against relative movement. The trays are then placed in the conventional incubator 10 wherein they are rotated at prescribed intervals over a period of days in a controlled atmosphere which facilitates embryonic development of the eggs. For example, in the incubation of chicken eggs, the atmosphere is normally maintained at about 99–100° F. dry bulb and 86° wet bulb, and the trays are presently rotated every hour at predetermined fixed intervals. At the end of the incubation period, one of the racks 50 is rolled into the incubator 10 and the trays 12, in their retracted position, are placed in the rack 50. Each tray 12 slides easily into the rack 50 with the adjacent side walls of each tray engaging one of the slide members. Specifically, the inwardly extending support surface 66 of each of the shelves 60 and 61 supports the adjacent edge portion of the tray 12, and the hook portions 67 thereof fit over the top edges 28 and 36 of the side walls 24 and 33 of the trays 12. When an entire rack is filled with trays, the hand crank 100 is rotated to effect rotation of each of the threaded shafts 85, in the manner described above, for moving each of the inner frames 56 toward the center of the rack 50, as shown in the broken lines of FIG. 8.

Movement of the frames 56 toward the center of the rack causes each of the trays 12 to be moved simultaneously to an expanded position, as shown in FIG. 3, wherein there is sufficient space between the eggs to allow proper hatching thereof as well as drying of the fowl. Since each of the shafts 85 is rotated simultaneously, each of the inner frames 56 is moved toward the center at the same rate so that a uniform force is applied by the shelves 61 along the entire length of the side walls 24 of the inner tray sections 16. As a result, there is no tendency for the frames 56 or the trays 12 to bind or otherwise present difficulty during expansion of the trays 12. The trays 12 are expanded until the inner frames 56 are moved to the center of the rack, as shown in the broken lines of FIG. 8, wherein the brackets 70 on the upper and lower ends of the frame members 58 and 59 are positioned adjacent the sprocket carriers 80 and further expansion thereof is blocked.

Then the rack 50 with the expanded egg trays 12 therein, is rolled into the hatcher 15 wherein the temperature and humidity are controlled at a different level. For example, to hatch chicken eggs, a dry bulb temperature of 99° F. and a wet bulb of 80°–87° is desirable over a three day period. The trays 12 when in the rack 50 are sufficiently close together so that the newly hatched chicks cannot escape therebetween, and the screen 105 covers the top trays 12, as explained above. After hatching, the rack 50 is removed from the hatcher, the trays 12 are removed from the rack, and the chicks or other type of fowl are removed from the trays 12 and processed for shipment. The trays 12 are then cleaned, moved to their retracted incubating position, and again filled with eggs and the above cycle is repeated.

While the invention has been shown and described as having a specific type of apparatus for expanding a large number of trays simultaneously, it should be appreciated that numerous other structural embodiments could be utilized to carry out the process of this invention without departing from the scope of the invention. For example, the process could be adapted for use with a single enclosure type of hatching system, wherein the expandable trays and associated rack are initially used to transport the eggs in the expandable trays into the single enclosure for incubation. After the incubation, the rack apparatus is used to expand each of the trays simultaneously for hatching, and after hatching the rack with the trays therein is removed from the enclosure. It is also within the scope of this invention to provide a rack capable of use in the single enclosure hatching system which would expand a large number of the trays from one size for incubation and a larger size for hatching, and which may or may not be permanently fixed in the enclosure.

The invention has thus provided an apparatus capable of quickly and easily transferring eggs from an incubator to a hatcher without requiring the usual transfer of eggs from one tray to another. The invention can be utilized with existing incubators and hatchers, and as a result, greatly reduces the cost of modernizing a hatchery thereby enabling even a small operator to update his equipment. In addition, the apparatus is simple in construction and operation for maximum dependability and long life. While the invention is particularly intended for hatching chicken, turkey, duck, pheasant, and quail eggs, its is possible to process any type of eggs therewith.

While the apparatus constitutes the preferred embodiment of the invention, it is to be understood that the invention is not limited to this precise form of apparatus, and that changes may be made without departing from the scope of the invention which is defined in the appended claims.

What is claimed is:

1. Apparatus for handling eggs during incubation and hatching thereof comprising, an expandable tray movable between an incubation position adapted to receive a plurality of eggs therein in intimate contact with one another for preventing any substantial relative movement between the eggs during handling of said trays and a hatching position wherein said tray is enlarged in size to provide the plurality of eggs with sufficient space therebetween for proper hatching the eggs, and rack means for receiving a plurality of said trays and for simultaneously moving said plurality of trays between said incubation and hatching positions to eliminate the transfer of eggs from one tray to a larger tray for incubation and hatching.

2. Apparatus for handling eggs during incubation and hatching thereof comprising, a plurality of expandable trays and including two sections telescoped together and movable with respect to each other between an incubation position for receiving and holding a plurality of eggs in intimate contact with one another to prevent any substantial relative movement between the eggs during handling of said trays and a hatching position wherein said tray is enlarged in area to provide the plurality of eggs with sufficient space for proper hatching and drying of chicks, a portable rack for receiving said plurality of said trays for transportation and handling thereof, and expander means on said rack for engaging said trays when said trays are placed in said rack for simultaneously moving each of said sections relative to its associated said section to effect movement thereof between said positions thus eliminating the transfer of eggs from one tray to a larger tray for incubation and hatching.

3. Apparatus for handling eggs during incubation and hatching thereof comprising, a plurality of expandable trays including two sections telescoped together and movable with respect to each other between an incubation position for receiving and holding a plurality of eggs in intimate contact with one another to prevent any substantial relative movement between the eggs during handling of said trays and a hatching position wherein said tray is enlarged in area to provide said plurality of eggs with sufficient space for proper hatching of the eggs, a rack means for receiving said plurality of trays for transportation and handling thereof, and expander means on said rack for engaging each said section of each said tray when said trays are placed in said rack for simultaneously moving each of said sections relative to its associated said section between said incubation and hatching positions to eliminate the transfer of eggs from one tray to a larger tray for incubation and hatching.

4. Apparatus for handling eggs during incubation and hatching thereof comprising, an expandable tray including a pair of telescoped sections movable with respect to each other between an incubation position for receiving and holding a plurality of eggs in intimate contact with one another against any substantial relative movement between the eggs during handling of said trays and a hatching position wherein said tray is enlarged to provide sufficient space between the plurality of eggs for proper hatching thereof, each of said sections having projection means extending therefrom for use in expanding said trays, a portable rack for receiving a plurality of said trays for transportation and handling thereof, said rack having plurality of tray receiving means for supporting said trays and including first retainer means for engaging said projections on one of said sections and second retainer means for engaging said projection means on the other of said sections, and actuator means for moving said first retainer means with respect to said second retainer means and in said direction of expansion of said trays to move said sections of each of said plurality of trays between said incubation and hatching positions of trays to eliminate the transfer of eggs from one tray to a larger tray for incubation and hatching.

5. Apparatus for handling eggs during incubation and hatching thereof comprising, a plurality of expandable trays each including two telescoped sections movable with respect to each other between an incubation position wherein a plurality of eggs are held therein in intimate contact with one another for holding the eggs against any substantial relative movement between the eggs during handling of said trays and a hatching position wherein said tray is enlarged to provide the plurality of eggs with sufficient space for proper hatching thereof, each of said sections having a projection extending therefrom for use in expanding said trays, and a rack for receiving said plurality of trays for transportation and handling thereof, a pair of frame members on said rack each having shelf means thereon for receiving said trays, and actuator means on said rack for moving said pair of frame members apart to expand simultaneously each of said plurality of trays by moving said sections to said hatching position thus eliminating the transfer of eggs from one tray to a larger tray for incubation and hatching.

6. Apparatus for handling eggs as defined in claim 5, wherein one of said frame members is stationary and the other is movable within said rack, and said rack has guide means for guiding movement of said movable frame member in a predetermined path for unobstructed expansion of said trays.

7. Apparatus for handling eggs as defined in claim 6, wherein said actuator means moves only said movable frame member, said actuator means including a plurality of screw members interconnecting said rack and said movable frame member, and means for simultaneously rotating each of said screw members to move said movable frame member toward or away from said stationary frame member in a predetermined direction.

8. Apparatus for handling eggs during incubation and hatching thereof comprising, a plurality of expandable trays each including a pair of telescoped sections movable with respect to each other between an incubation position wherein a plurality of eggs are held therein in intimate contact with each other against any substantial relative movement between the eggs during handling of said trays and a hatching position wherein said tray is enlarged to provide the plurality of eggs with sufficient space for proper hatching thereof, each of said sections having a projection extending therefrom in a plane perpendicular to the direction of relative movement between said sections, and a rack for receiving said plurality of said trays for transportation and handling thereof, said rack including a plurality of frame pairs each having movable and stationary frame members, a plurality of aligned tray receiving shelves for supporting said trays on said frame pairs, each of said shelves having engaging means for receiving said projections, and actuator means for moving each of said movable frame members with respect to its associated said stationary frame member to expand simultaneously said trays held thereby by moving said sections to said hatching position thus eliminating the transfer of eggs from one tray to a larger tray for incubation and hatching.

9. Apparatus for handling eggs during incubation and hatching thereof comprising, the combination of a rack having a plurality of expandable trays therein, said trays each including telescoped sections movable with respect to each other between an incubation position wherein a plurality of eggs are held therein in intimate contact with one another against any substantial relative movement between the eggs during handling of said trays and a hatching position wherein said tray is enlarged to provide the plurality of eggs with sufficient space for proper hatching thereof, each of said sections having a raised side wall, and a rack for receiving said plurality of said trays for transportation and handling thereof, a pair of frame members on said rack each having a plurality of aligned tray receiving shelves for supporting said trays, each of said shelves having engaging means for receiving and retaining said raised side walls, and actuator means for moving said pair of said frame members apart to expand simultaneously said trays by moving said sections to said hatching position thus eliminating the transfer of eggs from one tray to a larger tray for incubation and hatching.

References Cited by the Examiner

UNITED STATES PATENTS

| | | | |
|---|---|---|---|
| 2,087,044 | 7/1937 | Reiners | 119—43 |
| 2,148,681 | 2/1939 | Cameron. | |
| 2,266,648 | 12/1941 | Mack | 119—43 |
| 2,997,021 | 8/1961 | Bailey | 119—37 |
| 3,147,737 | 9/1964 | Theilig | 119—35 |

SAMUEL KOREN, *Primary Examiner.*

ALDRICH F. MEDBERY, *Examiner.*